US007624413B2

(12) United States Patent
Tsubouchi

(10) Patent No.: US 7,624,413 B2
(45) Date of Patent: Nov. 24, 2009

(54) DIGITAL BROADCASTING RECEIVER

(75) Inventor: Akinori Tsubouchi, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 491 days.

(21) Appl. No.: 11/087,665

(22) Filed: Mar. 24, 2005

(65) Prior Publication Data

US 2005/0229208 A1    Oct. 13, 2005

Related U.S. Application Data

(62) Division of application No. 10/156,009, filed on May 29, 2002.

(30) Foreign Application Priority Data

May 29, 2001 (JP) ............................ 2001-160145
Jun. 27, 2001 (JP) ............................ 2001-194596

(51) Int. Cl.
*H04N 5/445* (2006.01)
*G06F 3/00* (2006.01)
*G06F 13/00* (2006.01)

(52) U.S. Cl. ............................ 725/57; 725/44; 725/47; 725/52; 725/56; 725/133; 725/141; 725/153; 348/569; 348/570; 348/734

(58) Field of Classification Search .................. 725/44, 725/47, 52, 56, 57, 133, 141, 153; 348/569–570, 348/734
See application file for complete search history.

(56) References Cited

U.S. PATENT DOCUMENTS 4,914,517 A * 4/1990 Duffield ...................... 725/57
5,191,423 A * 3/1993 Yoshida ....................... 725/57
5,263,174 A * 11/1993 Layman ...................... 715/841
5,600,378 A 2/1997 Wasilewski
5,629,733 A * 5/1997 Youman et al. ............... 725/53
5,912,664 A * 6/1999 Eick et al. ................... 715/810
6,215,531 B1 * 4/2001 Beery ......................... 348/734
6,490,001 B1 12/2002 Shintani et al.
6,661,472 B2 12/2003 Shintani et al.

(Continued)

FOREIGN PATENT DOCUMENTS

JP 04-085883 A 3/1992

(Continued)

*Primary Examiner*—Jason P Salce
(74) *Attorney, Agent, or Firm*—Westerman, Hattori, Daniels & Adrian, LLP.

(57) ABSTRACT

There is provided a digital broadcasting receiver capable of making channel selection without making a user conscious of the difference between a physical channel number and a virtual channel number. A CPU uses an OSD display circuit, for example, to display a menu screen, and causes a user to select either a first mode or a second mode. The first mode is a mode for making channel selection by the physical channel number in which a frequency is assigned to a channel by the physical channel number in accordance with a rule, and a second mode is a mode for making channel selection by the virtual channel number in which a frequency corresponds to a channel on the side of the receiver. The CPU automatically makes, when no channel selection can be made by the entered channel number in the selected mode, an attempt to make channel selection corresponding to the other mode.

4 Claims, 10 Drawing Sheets

U.S. PATENT DOCUMENTS

| | | | | |
|---|---|---|---|---|
| 6,708,336 | B1 * | 3/2004 | Bruette | 725/57 |
| 6,766,526 | B1 * | 7/2004 | Ellis | 725/57 |
| 2002/0116713 | A1 | 8/2002 | Mukai et al. | |
| 2003/0014753 | A1 * | 1/2003 | Beach et al. | 725/53 |

FOREIGN PATENT DOCUMENTS

| | | | |
|---|---|---|---|
| JP | 04-306012 | A | 10/1992 |
| JP | 07-203327 | A | 8/1995 |
| JP | 10-222049 | A | 8/1998 |
| JP | 11-085785 | A | 3/1999 |
| JP | 11-298298 | A | 10/1999 |
| JP | 2000-092403 | A | 3/2000 |
| JP | 3070497 | U | 5/2000 |
| JP | 2000-155760 | A | 6/2000 |
| WO | WO 01/06776 | A1 | 1/2001 |
| WO | 01/30069 | A1 | 4/2001 |

* cited by examiner

DIGITAL BROADCASTING RECEIVER

This application is a divisional of U.S. patent application Ser. No. 10/156,009 filed on May 29, 2002 and claims the benefits of the priority from the prior Japanese Application No. 2001-160145 filed on May 29, 2001 and Japanese Application No. 2001-194596 filed on Jun. 27, 2001.

BACKGROUND OF THE INVENTION

Field of the Invention

The present invention relates to a digital broadcasting receiver that receives terrestrial wave digital broadcasting, for example. The terrestrial wave digital broadcasting has already been started oversees, and is scheduled to be started from 2003 in Japan. In direct channel selection in the terrestrial wave digital broadcasting (to make channel selection by pressing a numerical key in a remote control transmitter without using EPG (Electronic Program Guide)), channel selection is made by either a physical channel number (for example, determined as 90 to 96 MHz on the first channel) in which a frequency is assigned to a channel in accordance with a rule or a virtual channel number (for example, in a case where a channel is set by an existent station channel search) in which a frequency corresponds to a channel on the side of the receiver.

The physical channel number and the virtual channel number, described above, do not necessarily coincide with each other. When a user who is accustomed to current analog broadcasting makes direct channel selection in the terrestrial wave digital broadcasting, it is difficult to understand which of the physical channel number and the virtual channel number should be used to select a channel. Further, it is expected that the user is confused when a new channel is added. In the channel selection using the EPG, it takes much time for the user to reach a desired channel.

SUMMARY OF THE INVENTION

In view of the foregoing circumstances, an object of the present invention is to provide a digital broadcasting receiver capable of easily and quickly performing an operation for tuning in to a desired channel or broadcasting station.

In order to solve the above-mentioned problem, in a terrestrial wave digital broadcasting receiver that receives terrestrial wave digital broadcasting, a terrestrial wave digital broadcasting receiver according to the present invention is characterized in that either a first mode for making channel selection by a physical channel number in which a frequency is assigned to a channel in accordance with a rule and a second mode for making channel selection by a virtual channel number in which a frequency corresponds to a channel on the side of the receiver is used as a basis, to make an attempt to make channel selection, considering the entered channel number as the virtual channel number when an effective transmission signal is not detected in the channel selection by the first mode on the basis of the entered channel number, while making an attempt to make channel selection, considering the entered channel number as the physical channel number when information for selecting a channel is not stored in the channel selection by the second mode on the basis of the entered channel number.

In the above-mentioned configuration, the channel selection is made by either one of the two modes respectively corresponding to the physical channel number and the virtual channel number. Even if either one of the modes is selected, however, if the channel selection cannot be made by the channel number entered in the mode, such control as to automatically make an attempt to make the channel selection corresponding to the other mode is carried out. Accordingly, the user can tune in to a channel without being conscious of the difference between the physical channel number and the virtual channel number.

Furthermore, in a terrestrial wave digital broadcasting receiver that receives digital broadcasting, a terrestrial wave digital broadcasting receiver according to the present invention is characterized by comprising storage means for storing the names of broadcasting stations and information for tuning in to the broadcasting stations with a correspondence established therebetween; means for handling an output signal of a key in a remote control transmitter using the key as a key representing one or a plurality of characters to select the name of the broadcasting station corresponding to the entered character or characters; and means for performing a channel selection operation for receiving a broadcasting wave from the selected broadcasting station.

In the above-mentioned configuration, a user can cause the receiver to recognize the name of the broadcasting station which he or she desires to view by key entry to perform an operation for tuning in to the broadcasting station. Consequently, the channel selection can be made without depending on direct channel selection in which it is difficult to understand which of the virtual number and the physical number is used to select a channel or channel selection using EPG whose operation takes time and labor, thereby making it possible to easily and quickly perform an operation for tuning in to a desired broadcasting station.

Furthermore, in a digital broadcasting receiver that receives digital broadcasting, a digital broadcasting receiver according to the present invention is characterized by comprising storage means for storing the names of broadcasting stations and information for tuning in to the broadcasting stations with a correspondence established therebetween; means for handling an output signal of a key in a remote control transmitter using the key as a key representing one or a plurality of characters to select the name of the broadcasting station including the character or characters entered by the key in each step of key entry and display a list of the names of the broadcasting stations on a screen; and means for performing a channel selection operation for receiving a broadcasting wave from the broadcasting station determined on the basis of an operation on the display screen.

In the above-mentioned configuration, if a user knows even one character at the head of the name of the broadcasting station which he or she desires to view, a list of broadcasting station names including the character at their heads is displayed. The name of the broadcasting station which is desired to be viewed is determined on the list of the screen, so that an operation for tuning in to the broadcasting station is automatically performed. Further, if the user knows two characters at the head of the name of the broadcasting station, a list further narrowed down from the above-mentioned list is displayed, thereby making it possible to select the name of the broadcasting station on the list of the screen.

The digital broadcasting receiver may be so constructed as to takeout information related to the name of the broadcasting station and information for tuning in to the broadcasting station from the digital broadcasting wave, and store the name of the broadcasting station and the information for tuning in to the broadcasting station with a correspondence established therebetween. Further, the digital broadcasting station may be so constructed as to display, when there is no key entry within a predetermined time period elapsed since a mode for tuning in to broadcasting stations by the names thereof was selected, all the stored names of all the broadcasting stations on the screen, thereby making it possible to determine the name of the broadcasting station on the basis of an operation on the display screen.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A terrestrial wave digital broadcasting receiver according to an embodiment of the present invention will be described on the basis of FIGS. 1 to 9.

Figure 1:
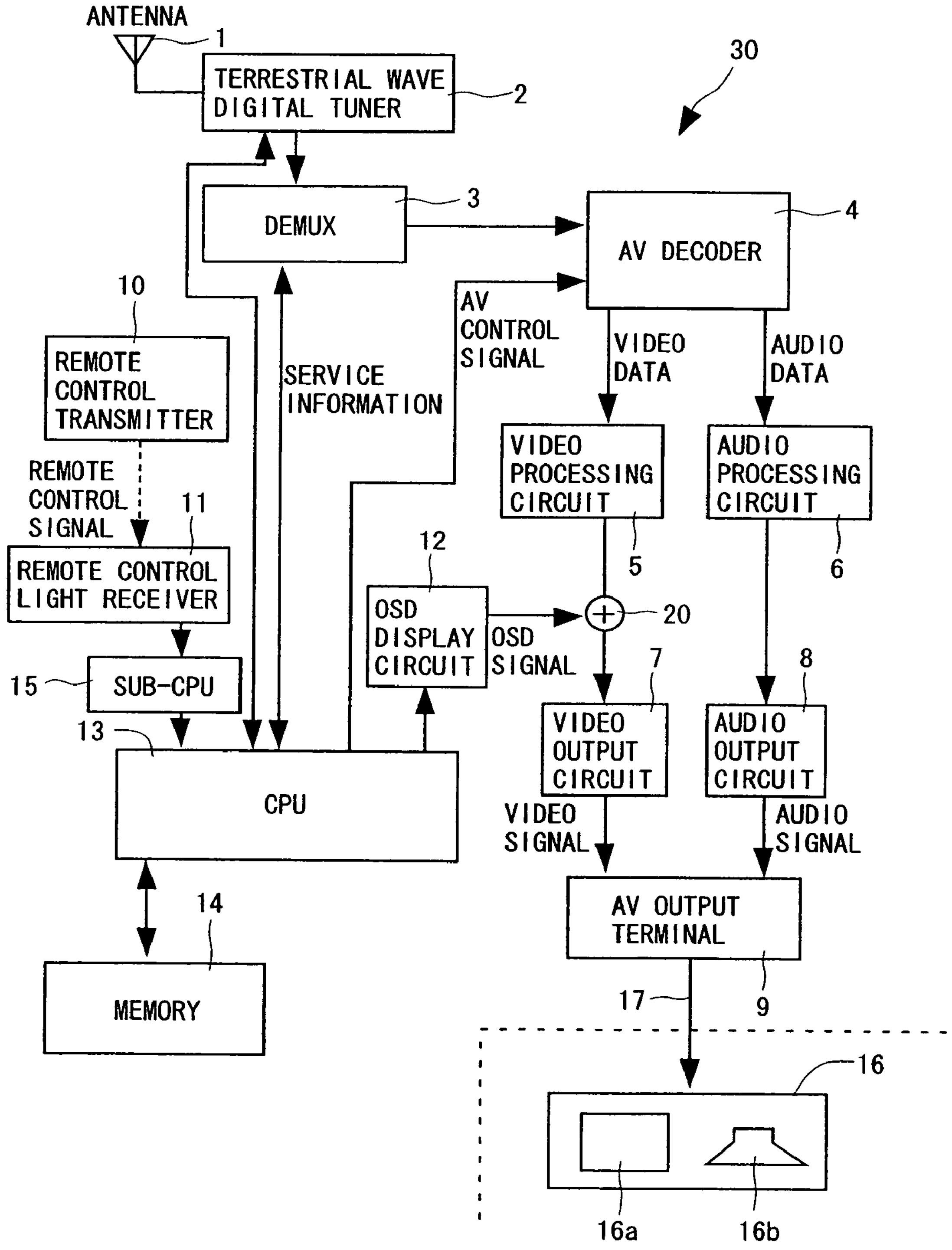
FIG. 1 is a block diagram showing a terrestrial wave digital broadcasting receiver according to an embodiment of the present invention.

In FIG. 1, a terrestrial wave antenna 1 receives a terrestrial broadcasting wave, and feeds a receiving signal to a terrestrial wave digital tuner 2. The terrestrial wave digital tuner 2 comprises a channel selection processing circuit, a mixer, and so on. The mixer mixes a signal on a desired channel and a local oscillation signal together, to generate an intermediate frequency signal. A circuit for generating the local oscillation signal comprises a variable capacity diode whose capacity varies depending on an applied voltage, for example, and generates a local oscillation signal which is varied in correspondence with the signal on the desired channel such that the signal having a predetermined intermediate frequency is outputted from the mixer. The channel selection processing circuit receives data representing an applied voltage (a tuning voltage) corresponding to each channel from a memory (e.g., EEPROM (Electrically Erasable and Programmable ROM)), changes the above-mentioned data into an analog signal (voltage) by a D/A (Digital-to-Analog) converter (not shown), and feeds the analog signal to the variable capacity diode. The terrestrial wave digital tuner 2 takes, out of high-frequency digital modulation signals including video/audio data, the digital modulation signal having a particular frequency by the above-mentioned channel selection processing. Further, the terrestrial wave digital tuner 2 comprises an inverse interleave circuit, an error correcting circuit, a demodulating circuit, and so on, thereby demodulating the selected digital modulation signal to output a transport stream.

A demultiplexer (DEMUX) 3 separates the transport stream received from the tuner 2 into a video stream and an audio stream based on MPEG2 (Moving Picture Experts Group2) and PSI/SI (Program Specific Information/Service Information). The demultiplexer 3 feeds the video stream and the audio stream to an AV decoder 4, and feeds the PSI/SI to the CPU 13. A plurality of channels can be multiplexed on the transport stream. Processing for selecting any one of the channels can be performed by taking out data indicating which packet ID in the transport stream is used to multiplex the arbitrary channel from NIT (Network Information Table), PAT (Program Association Table), and CAT (Conditional Access Table) in the above-mentioned PSI. Further, the PSI/SI includes service information (the contents of a program, the time when the program begins, a time period during which the program is continued, genre information, etc.), information related to the name of a broadcasting station (a short name in case of terrestrial wave digital broadcasting in the U.S. and a broadcaster ID in case of BS digital broadcasting). An EPG screen is constructed on the basis of such information.

The AV decoder 4 comprises a video decoder for decoding the video stream and an audio decoder for decoding the audio stream. The video decoder decodes an entered variable length code to find a quantization factor and a motion vector, thereby carrying out inverse DCT (Discrete Cosine Transformation) and motion compensation control based on the motion vector. The audio decoder decodes a coded signal which has been entered, to produce audio data. The video data generated by the decoding is outputted to a video processing circuit 5, and the audio data is outputted to an audio processing circuit 6.

The video processing circuit 5 receives the video data from the AV decoder 4 and subjects the received video data to digital-to-analog (D/A) conversion, to generate a video signal. The audio processing circuit 6 receives the audio data outputted from the AV decoder 4 and subjects the received audio data to digital-to-analog (D/A) conversion, to generate an analog audio signal.

An OSD (On-Screen Display) circuit 12 outputs to an adder 20 a video signal corresponding to character information which is instructed to output from a CPU 13. The adder 20 incorporates the video signal from the OSD circuit 12 into the received video signal, and feeds the video signal to a video output circuit 7.

Each of the video output circuit 7 and an audio output circuit 8 comprises an output resistor, an amplifier, and so on. An AV output terminal 9 is provided with an output unit (a set of a right/left audio output terminal or the like and a video output terminal or the like). A monitor 16 comprising a CRT (Cathode-Ray Tube) 16*a* and a speaker 16*b* is connected to the output unit by a video/audio code 17.

Figure 2A:
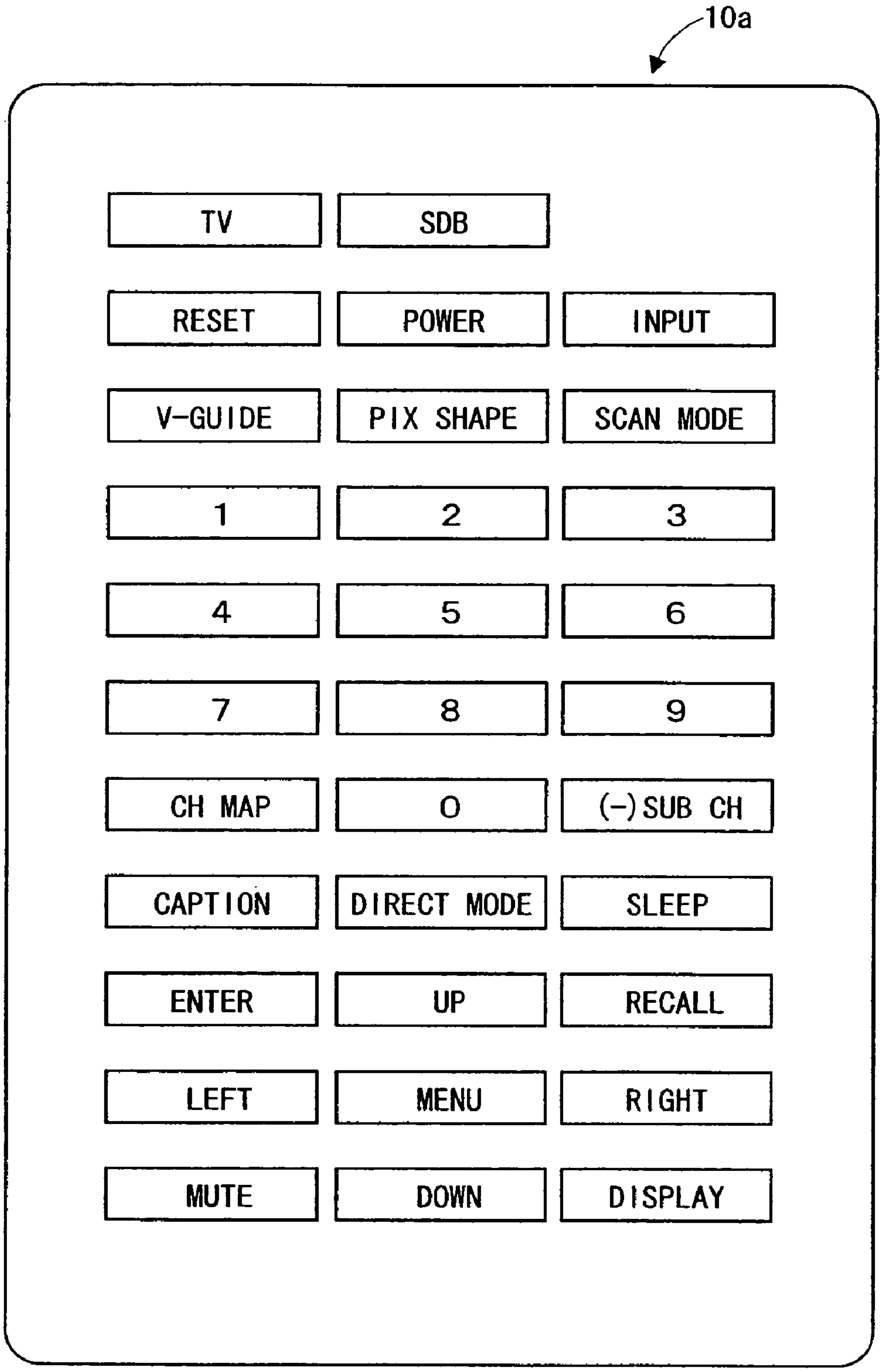
FIGS. 2A and 2B are plan views each showing the appearance of a remote control transmitter.
Figure 2B:
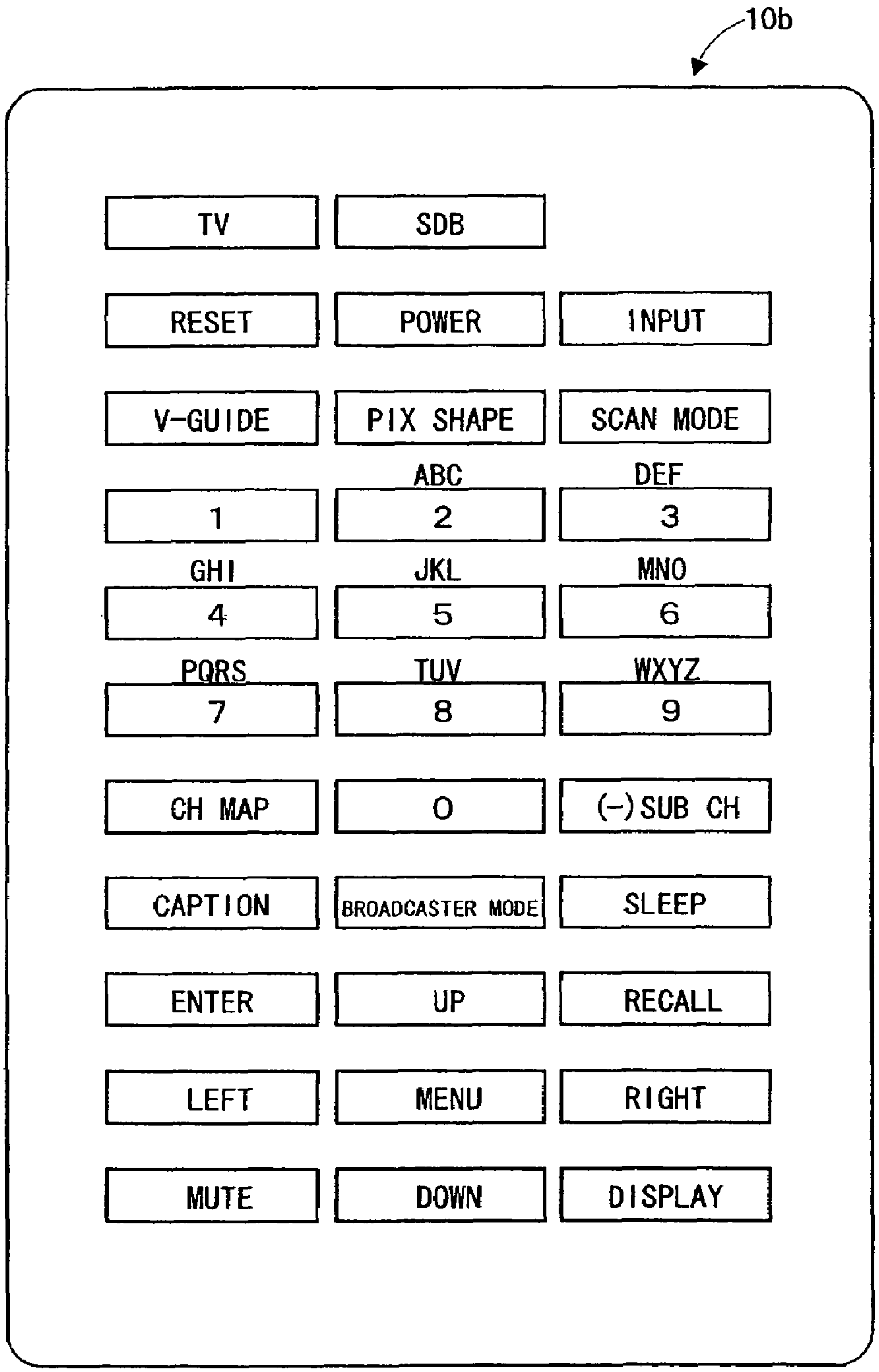

A remote control transmitter 10 (10*a*, 10*b*) is a transmitter for sending out a command to a corresponding broadcasting receiver 30, and the appearance thereof is as shown in FIGS. 2A and 2B, for example. When a key provided in the remote control transmitter 10 is operated, signal light (a remote control signal) meaning a command corresponding to the key is sent out from a light emitter (not shown). A remote control light receiver 11 receives the signal light, converts the received signal light into an electric signal, and feeds the electric signal to a sub-CPU 15. Information related to an operation key is given to the CPU 13 through the sub-CPU 15.

In the remote control transmitter 10*b*, three or four alphabetic characters are assigned to each of numerical keys "2" to "9". For example, characters "ABC" are assigned to the numerical key "2", and characters "DEF" are assigned to the numerical key "3" (2=ABC, 3=DEF, 4=GHI, 5=JKL, 6=MNO, 7=PQRS, 8=TUV, 9=WXYZ) In a mode for tuning in to broadcasting stations by the names thereof, when the numerical key "2", for example, is pressed, the CPU 13 recognizes the signal light (remote control signal) as a signal meaning any of the characters "ABC". Although in the present embodiment, the mode for tuning in to broadcasting stations by the names thereof is carried out when a BROADCASTERMODE key in the remote control transmitter 10 is pressed, a method of displaying a "broadcasting station name channel selection mode", for example, on a menu screen and setting the mode for tuning in to broadcasting stations by the names thereof when a portion where the "broadcasting station name channel selection mode" is displayed on the menu screen is selected by a user may be employed.

The CPU 13 carries out control for channel selection, and an existent station channel search, or the like for the terrestrial wave digital tuner 2, control for writing/readout of information related to an existent station channel, service information, or the like to/from a memory 14, control for the demultiplxer 3, control for the AV decoder 4, control for the OSD circuit 12, and the like. The direct channel selection processing according to the present invention out of the various types of processing will be described below.

[Direct Channel Selection]

Direct channel selection is for the user to directly operate a numerical key in the remote control transmitter 10 without using EPG to select a channel. Here, in the terrestrial wave digital broadcasting, there exist a physical channel number (e.g., 90 to 96 MHz on the first channel) in which a frequency is assigned to a channel in accordance with a rule and a virtual channel number (e.g., set by the existent station channel search) in which a frequency corresponds to a channel on the side of the receiver. In the direct channel selection, the user is caused to choose which of the physical channel number and the virtual channel number is used to select a channel. For example, the selection may be made by displaying items to be selected on the menu screen and causing the user to select any of the items to be selected or providing a physical/virtual switching key in the remote control transmitter 10.

Figure 3:
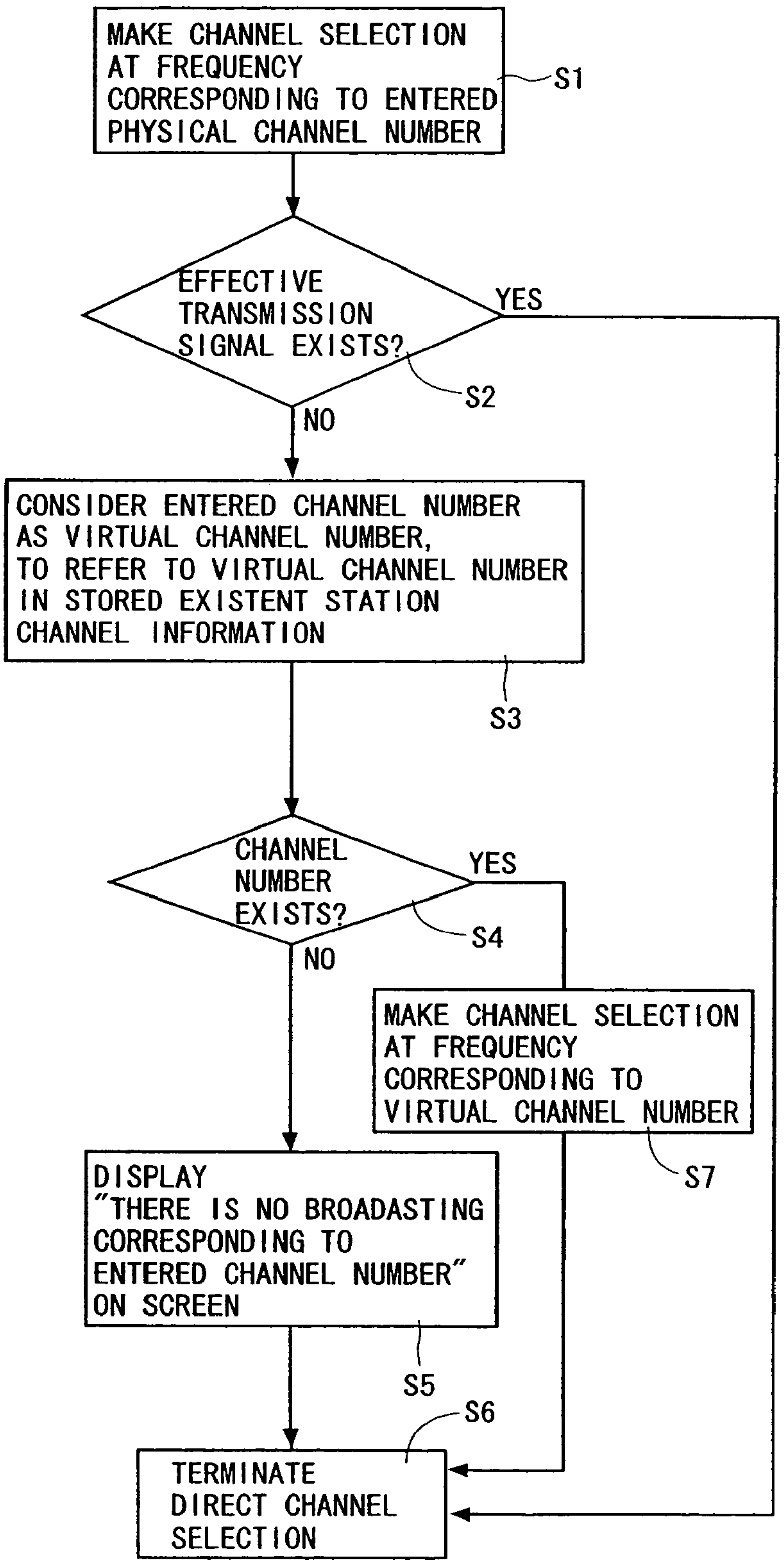
FIG. 3 is a flow chart showing direct channel selection processing at the time of a mode for selecting a channel by a physical channel number.
Figure 4:
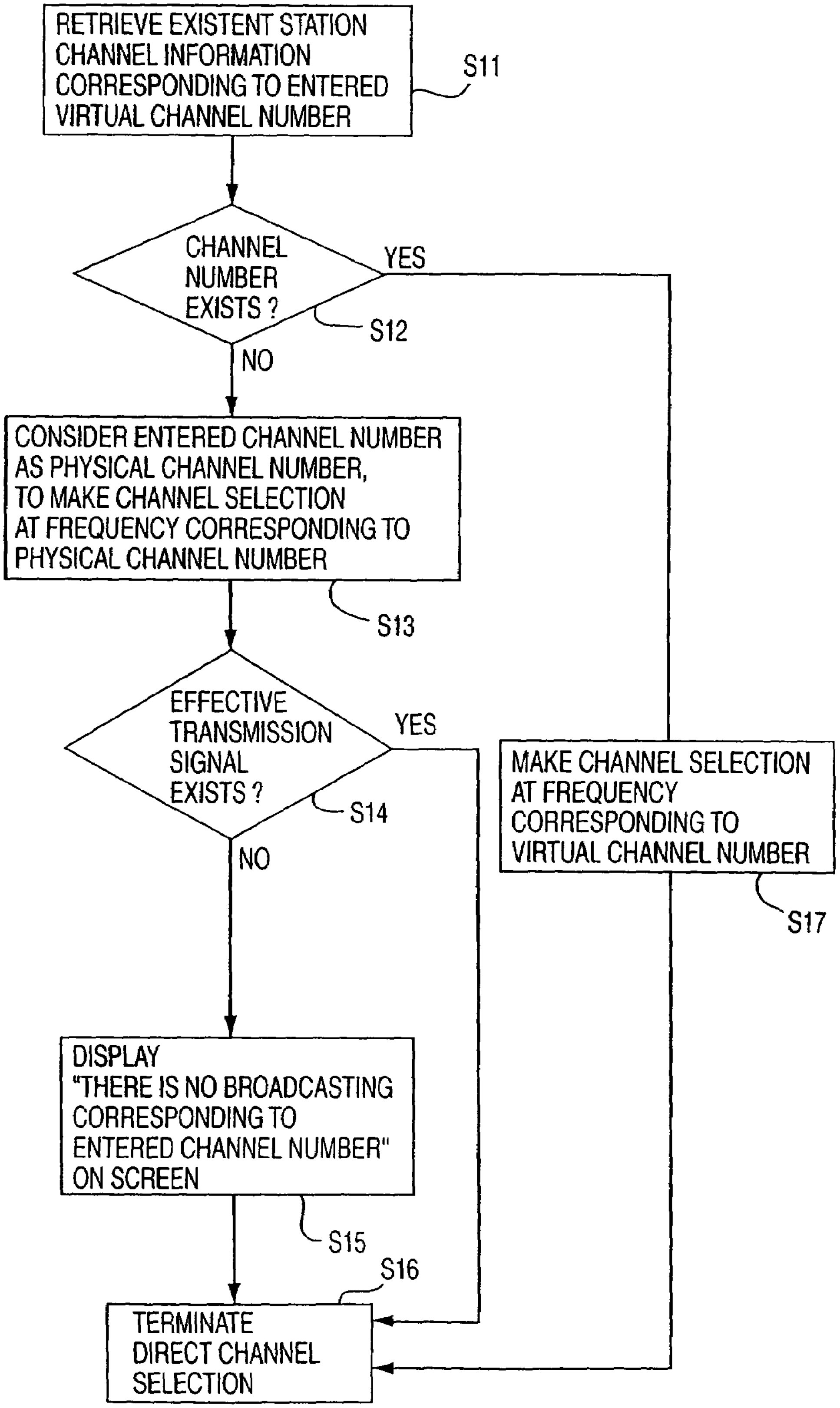
FIG. 4 is a flow chart showing direct channel selection processing at the time of a mode for selecting a channel by a virtual channel number.

FIG. 3 is a flow chart in a case where the user chooses that channel selection is made using the physical channel number, and FIG. 4 is a flow chart in a case where the user chooses that channel selection is made using the virtual channel number.

In the processing shown in FIG. 3, channel selection processing is performed at a frequency corresponding to the entered physical channel number (step S1). If an effective transmission signal is confirmed by the channel selection processing (step S2), the direct channel selection is terminated (step S6). On the other hand, if no effective transmission signal is confirmed, the entered channel number is considered as the virtual channel number, to refer to the virtual channel number in the existent station channel information stored in the memory 14 (step S3). It is judged whether or not the channel number exists (step S4). If the channel number exists, channel selection processing is performed at a frequency corresponding to the virtual channel number (step S7), and the direct channel selection is terminated (step S6) On the other hand, unless the channel number exists, "there is no broadcasting corresponding to entered channel number" is displayed on the screen (step S5), and the direct channel selection is terminated (step S6).

In the processing shown in FIG. 4, retrieval is performed as to whether or not the entered virtual channel number is stored in the memory 14 as the virtual channel number in the existent station channel information (step 11). If the existent station channel information related to the virtual channel number exists (step S12), channel selection processing is performed at a frequency corresponding to the virtual channel number (step S17), and the direct channel selection is terminated (step S16). If there is no information related to the virtual channel number, the entered channel number is considered as the physical channel number, to perform channel selection processing at a frequency corresponding to the physical channel number (step S13) If an effective transmission signal is confirmed by the channel selection processing (step S14), the direct channel selection is terminated (step S16). On the other hand, if no effective transmission signal is confirmed, "there is no broadcasting corresponding to entered channel number" is displayed on the screen (step S15), and the direct channel selection is terminated (step S16).

Here, the specific contents of processing under the following estimated conditions will be described.

① Existent station channel information on a virtual channel 36 shall be stored in correspondence with the frequency of a physical channel 13 by an existent station channel search.

② There is no effective transmission signal on a physical channel 36.

③ There is an effective transmission signal on a physical channel 20, but no existent station channel information is stored therein.

④ There is no effective transmission signal on a physical channel 30, and a virtual channel 30 is not stored in the existent station channel information.

⑤ Channel selection by the physical channel number and channel selection by the vertical channel number are switched by toggling by pressing a key (DIRECT MODE) in the remote control transmitter 10*a*.

⑥ The current (initial) direct channel selection mode shall be the channel selection by the physical channel number.

A. Case where a "1" key in the remote control transmitter 10*a* is pressed, and the "3" key is then pressed The sub-CPU 15 informs the CPU 13 that the keys "1" and "3" are pressed. The CPU 13 controls the tuner 2 so as to perform a channel selection operation at a frequency corresponding to the physical channel 13. The tuner 2 informs the CPU 13 that an effective transmission signal exists after the channel selection operation. Consequently, the channel selection processing is terminated.

B. Case where the "3", key in the remote control transmitter 10*a* is pressed, and the "6" key is then pressed The sub-CPU 15 informs the CPU 13 that the keys "3" and "6" are pressed. The CPU 13 controls the tuner 2 so as to perform a channel selection operation at a frequency corresponding to the physical channel 36. The tuner 2 informs the CPU 13 that no effective transmission signal exists after the channel selection operation. The CPU 13 considers "36" as a virtual channel number, refers to the existent station channel information stored in the memory 14 to confirm that the virtual channel 36 exists, and controls the tuner 2 so as to make channel selection at a frequency corresponding to the physical channel 13 on the basis of the information. Consequently, the channel selection processing is terminated.

C. Case where the "2" key in the remote control transmitter 10*a* is pressed, and a "0" key is then pressed The sub-CPU 15 informs the CPU 13 that the keys "2" and "0" are pressed. The CPU 13 controls the tuner 2 so as to perform a channel selection operation at a frequency corresponding to the physical channel 20. The tuner 2 informs the CPU 13 that an effective transmission signal exists after the channel selection operation. Consequently, the channel selection processing is terminated. Further, the CPU 13 adds the fact that the physical channel 20 exists to the existent station channel information stored in the memory 14. Such addition occurs in a case where a broadcasting station is newly opened on the physical channel 20 after a channel search made after the receiver was purchased.

D. Case where the "3" key in the remote control transmitter 10*a* is pressed, and the "0" key is then pressed The sub-CPU 15 informs the CPU 13 that the keys "3" and "0" are pressed. The CPU 13 controls the tuner 2 so as to perform a channel selection operation at a frequency corresponding to the physical channel 30. The tuner 2 informs the CPU 13 that no effective transmission signal exists after the channel selection operation. The CPU 13 considers "30" as a virtual channel number, and confirms whether or not the virtual channel 30 exists on the basis of the existent station channel information stored in the memory 14. However, the virtual channel 30 does not exist. Accordingly, the OSD circuit 12 is used, to display "there is no broadcasting corresponding to entered channel number", on the screen. Consequently, the channel selection processing is terminated.

E. Case where the DIRECT MODE key in the remote control transmitter 10*a* is pressed, the "3", key is pressed, and the "6" key is then pressed The sub-CPU 15 informs the CPU 13 that the DIRECT MODE key and the keys "3" and "6" are pressed. The CPU 13 considers "36" as a virtual channel number, refers to the existent station channel information stored in the memory 14 to confirm that the virtual channel 36 exists, and controls the tuner 2 so as to make channel selection at a frequency corresponding to the physical channel 13 on the basis of the information. Consequently, the channel selection processing is terminated.

F. Case where the DIRECT MODE key in the remote control transmitter 10*a* is pressed, the "1" key is further pressed, and the "3", key is then pressed The sub-CPU 15 informs the CPU 13 that the DIRECT MODE key and the keys "1" and "3" are pressed. The CPU 13 considers "13" as a virtual channel number, and refers to the existent station channel information stored in the memory 14 to confirm that the virtual channel 13 exists. However, the virtual channel 13 does not exist. Accordingly, the CPU 13 considers the channel 13 as a physical channel, and controls the tuner 2 so as to make channel selection at a frequency corresponding to the physical channel 13. Consequently, the channel selection processing is terminated.

G. Case where the DIRECT MODE key in the remote control transmitter 10*a* is pressed, the "2" key is further pressed, and the "0" key is then pressed The sub-CPU 15 informs the CPU 13 that the DIRECT MODE key and the keys "2" and "0" are pressed. The CPU 13 considers "20" as a virtual channel number, and refers to the existent station channel information stored in the memory 14 to confirm whether or not the virtual channel 20 exists. However, the virtual channel 20 does not exist. Accordingly, the CPU 13 considers the channel 20 as a physical channel, and controls the tuner 2 so as to make channel selection at a frequency corresponding to the physical channel 20. Further, the CPU 13 adds the fact that the physical channel 20 exists to the existent station channel information stored in the memory 14. Consequently, the channel selection processing is terminated.

H. Case where the DIRECT MODE key in the remote control transmitter 10*a* is pressed, the "3" key is further pressed, and the "0" key is then pressed The sub-CPU 15 informs the CPU 13 that the DIRECT MODE key and the keys "3" and "0" are pressed. The CPU 13 considers "30", as a virtual channel number, and refers to the existent station channel information stored in the memory 14 to confirm whether or not the virtual channel 30 exists. However, the virtual channel 30 does not exist. Accordingly, the CPU 13 considers the channel 30 as a physical channel, and controls the tuner 2 so as to make channel selection at a frequency corresponding to the physical channel 30. Since there is no effective transmission signal on the physical channel 30, and the virtual channel 30 does not exist in the existent station channel information, the tuner 2 informs the CPU 13 that there is no effective transmission signal after a channel selection operation. The CPU 13 uses the OSD circuit 12, to display "there is no broadcasting corresponding to entered channel number" on the screen. Consequently, the channel selection processing is terminated.

As described in the foregoing, according to the foregoing processing, if no channel selection can be made by a channel number entered in the mode used as a basis, control for making an attempt to automatically make channel selection corresponding to the other mode is carried out. Accordingly, the user can make channel selection without being conscious of the difference between the physical channel number and the virtual channel number.

[Broadcasting Station Name Direct Channel Selection]

Figure 5:
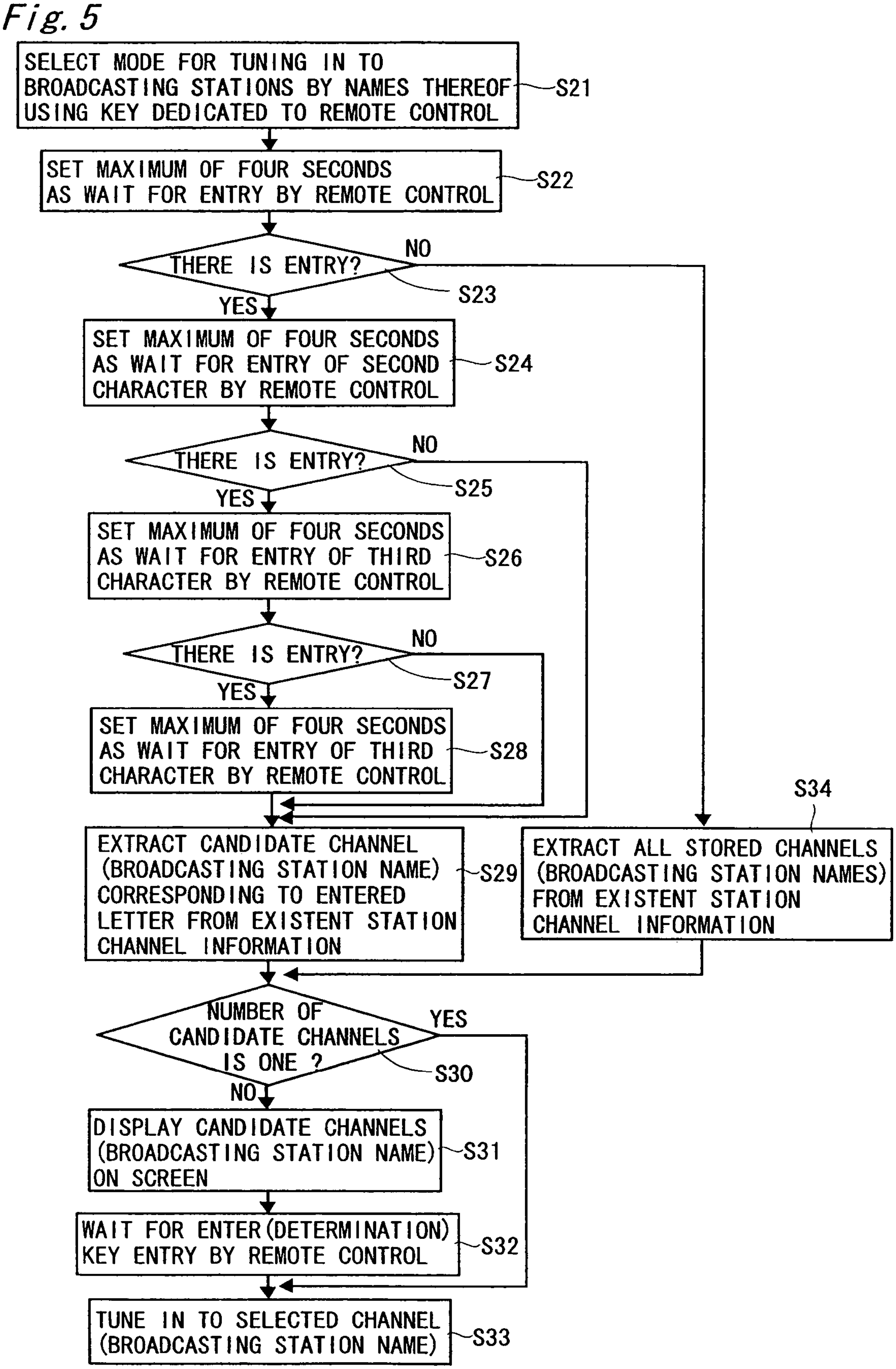
FIG. 5 is a flow chart showing an example of broadcasting station name direct channel selection processing.

In order to make broadcasting station name direct channel selection, information is stored in the memory 14 by establishing a correspondence between the name of a broadcasting station, previously described, and a physical channel number or a virtual channel number. FIG. 5 is a flow chart showing broadcasting station name direct channel selection processing performed by the CPU 13. When a BROADCASTER-MODE key (see FIG. 2B) in the remote control transmitter 10*b* is pressed, the processing proceeds to a mode for tuning in to broadcasting stations by the names thereof (step S21), and sets a maximum of four seconds as a key entry wait state of the remote control transmitter 10*b* to successively accept entry of up to four characters (steps S22, S23, S24, S25, S26, S27, and S28). When there is no key entry after the processing proceeds to the mode for tuning in to broadcasting stations by the names thereof, all stored channels (broadcasting station names) are displayed on the screen (step S34). On the other hand, if there is key entry, a candidate channel (a broadcasting station name) including entered characters in the entered order is retrieved in the existent station channel information (step S29). It is then judged whether or not the number of candidate channels is one (step S30). If the number of candidate channels is one, a channel selection operation is performed by the tuner 2 (step S33). On the other hand, if the number of candidate channels is plural, the candidate channels (broadcasting station names) are displayed on the screen (step S31), to perform determination processing on the basis of an operation using the remote control transmitter 10*b* by the user (step S32). A channel selection operation is performed by the tuner 2 with respect to the determined channel (broadcasting station name) (step S33).

In an example of the processing shown in the flow chart, when there is no entry by the remote control transmitter 10*b* within a determined time period, all the stored broadcasting station names are displayed on the screen. When there is no key entry by the remote control transmitter 10*b* within a time period determined after the first character is entered, the broadcasting station names (starting with ABC or 2 when "2"

is entered) corresponding to a key by which the first character is entered are displayed on the screen. Further, the broadcasting station names to be candidates are similarly displayed on the screen with respect to the second character or the third character. With respect to the display on the screen, the user uses UP, DOWN, RIGHT, and LEFT keys for operating a menu, to select the desired broadcasting station name. Further, an ENTER (determination) key is pressed, to determine the selection. A channel corresponding to the broadcasting station name selected at the time point where the selection is determined is selected.

Figure 6A:
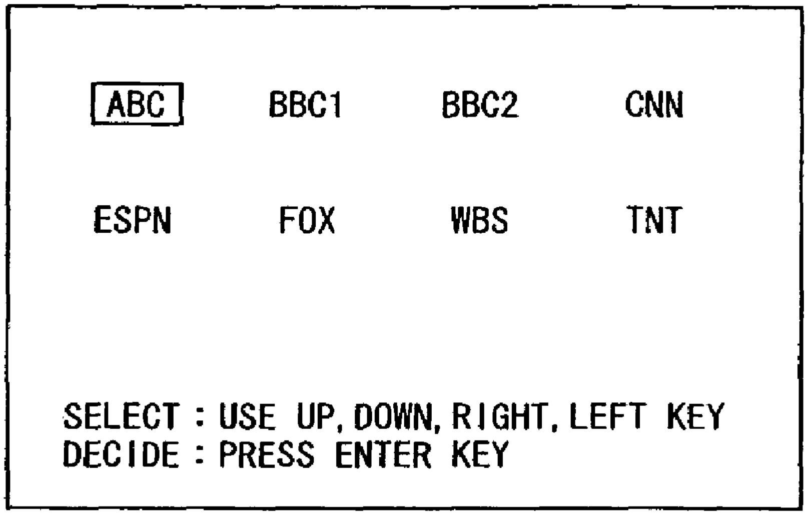
FIGS. 6A and 6B are explanatory views each showing an example of display on a screen at the time of broadcasting station name direct channel selection processing.
Figure 6B:
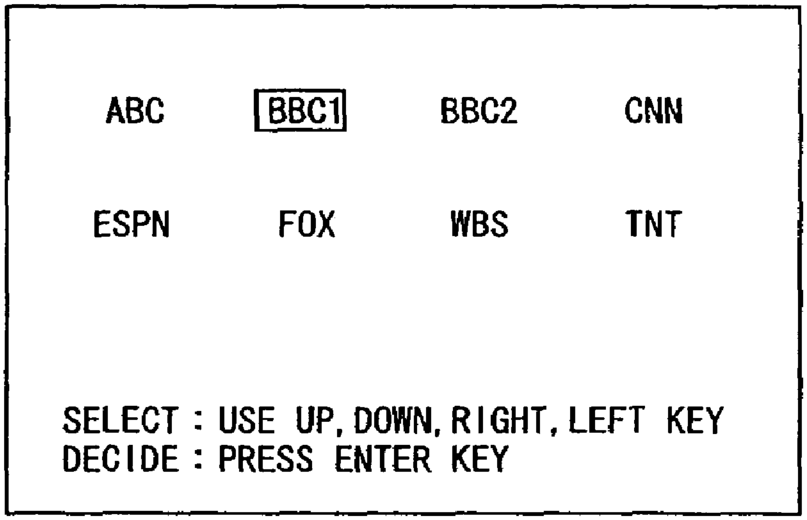

An example of specific processing of the broadcasting station name direct channel selection by the above-mentioned narrowing function will be described while referring to FIGS. 6 to 9. It is assumed that the broadcasting station names stored by an existent station channel search are eight in number, i.e., ABC, BBC1, BBC2, CNN, ESPN, FOX, WBS, and TNT.

i) When an attempt to tune in to BBC1 is made a) It is assumed that no characters are entered The user presses the BROADCASTERMODE key in the remote control transmitter 10*b*. The processing enters a key entry wait state for a maximum of four seconds. However, there is no key entry. Accordingly, the CPU 13 reads out all the broadcasting station names (channel information) stored in the memory 14, and uses the OSD display circuit 12, to display all the broadcasting station names, as shown in FIG. 6A. The user uses each of the UP, DOWN, RIGHT, and LEFT keys in the remote control transmitter 10 so that an enclosed line is positioned on the BBC1, as shown in FIG. 6B (in this case, the RIGHT key is pressed once). The user then presses the ENTER key in the remote control transmitter 10*b*, to determine the name of the broadcasting station to be tuned in to. Therefore, the CPU 13 knows that the BBC1 is selected, and feeds channel selection information to the digital tuner 2 such that the frequency of a physical channel corresponding to the BBC1 is tuned in to from the existent station channel information stored in the memory 14, to perform a channel selection operation.

b) It is assumed that only one character is entered

Figure 7A:
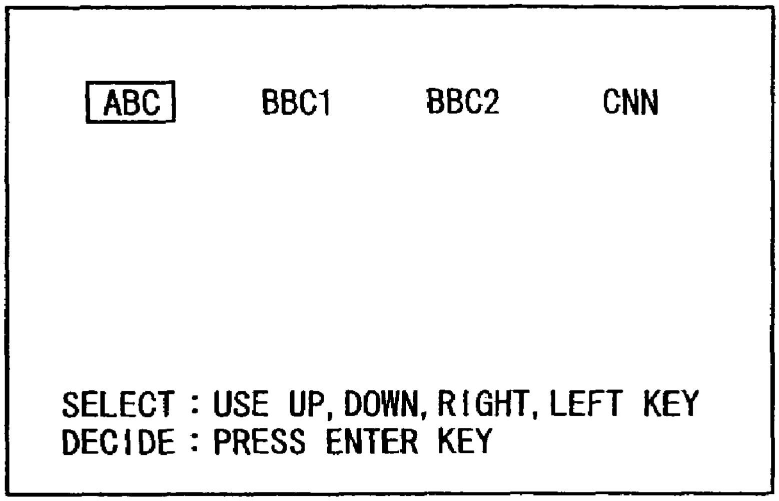
FIGS. 7A and 7B are explanatory views each showing an example of display on a screen at the time of broadcasting station name direct channel selection processing.
Figure 7B:
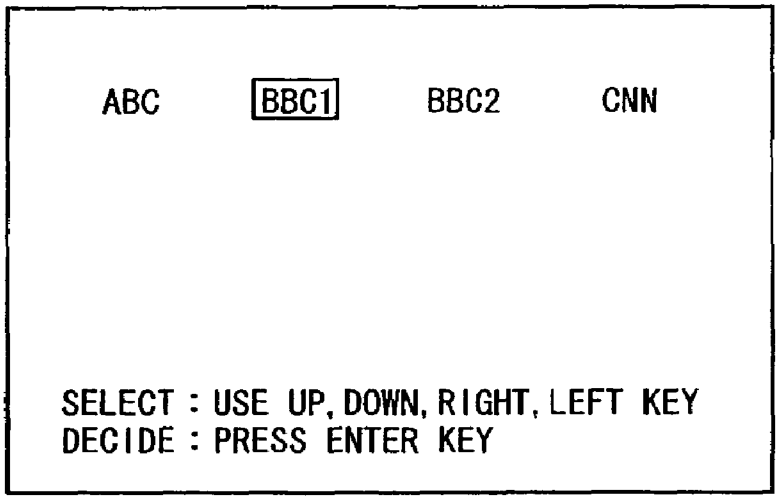

The user presses the BROADCASTERMODE key in the remote control transmitter 10*b*. The processing enters a key entry wait state for a maximum of four seconds. During this time, the user presses a ten-key "2" in the remote control transmitter 10*b* which is a key corresponding to "B". There is no key entry in the subsequent key entry wait state. Accordingly, the CPU 13 retrieves the broadcasting station names, each starting with a letter "A", "B", "C", or "2". In this case, the number of broadcasting station names to be candidates is not one. Accordingly, all the candidate broadcasting station names are read out of the memory 14, and are displayed, as shown in FIG. 7A. The user uses each of the UP, DOWN, RIGHT, and LEFT keys in the remote control transmitter 10*b* so that an enclosed line is positioned on the BBC1, as shown in FIG. 7B (in this case, the RIGHT key is pressed once). The user then presses the ENTER key in the remote control transmitter 10*b*, to determine the name of the broadcasting station to be tuned in to. Therefore, the CPU 13 knows that the BBC1 is selected, and feeds channel selection information to the digital tuner 2 such that the frequency of the physical channel corresponding to the BBC1 is tuned in to from the existent station channel information stored in the memory 14, to perform a channel selection operation.

c) It is Assumed That Two Characters are Entered

Figure 8A:
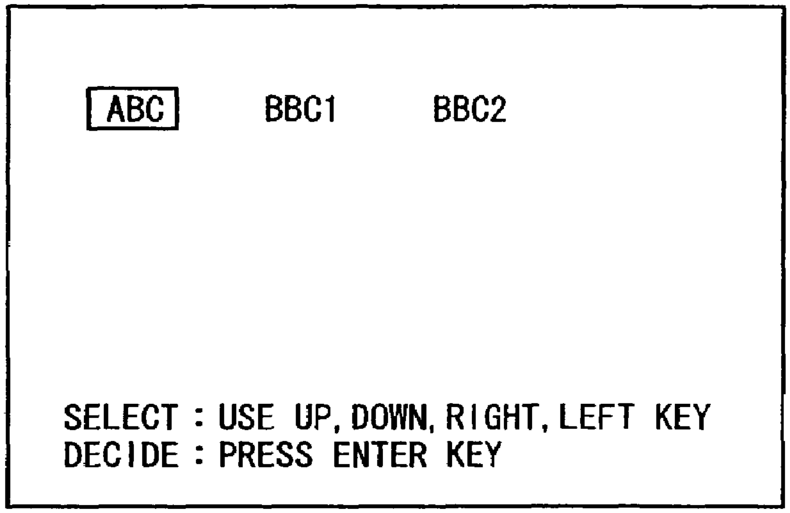
FIGS. 8A and 8B are explanatory views each showing an example of display on a screen at the time of broadcasting station name direct channel selection processing.
Figure 8B:
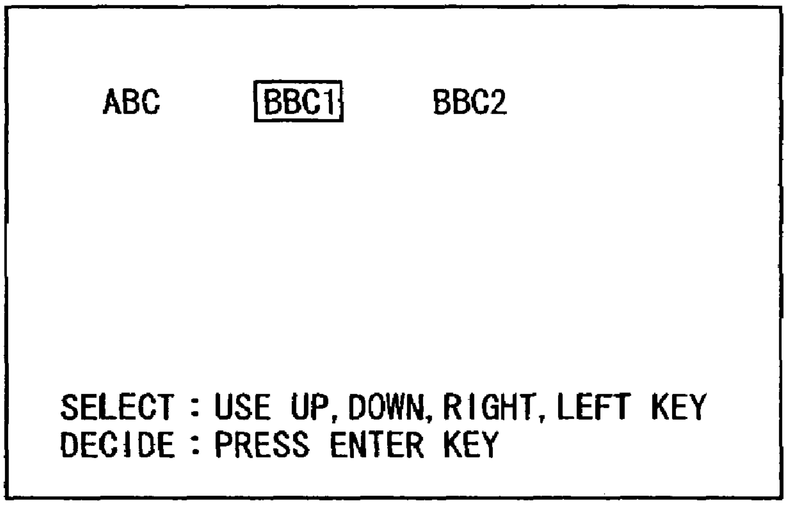

The user presses the BROADCASTERMODE key in the remote control transmitter 10*b*. The processing enters a key entry wait state for a maximum of four seconds. During this time, the user presses the ten-key "2" in the remote control transmitter 10*b* which is a key corresponding to "B", and similarly presses the ten-key "2" in the remote control transmitter 10*b* which is a key corresponding to "B" for four seconds in the subsequent key entry wait state. There is no key entry in the subsequent key entry wait state. Accordingly, the CPU 13 retrieves the broadcasting station names, each starting with a letter "A", "B", "C", or "2" and having a letter "A", "B", "C", or "2" as its second character. The number of broadcasting station names to be candidates is not one. Therefore, all the candidate broadcasting station names are read out of the memory 14, and are displayed, as shown in FIG. 8A. The user uses each of the UP, DOWN, RIGHT, and LEFT keys in the remote control transmitter 10*b* so that an enclosed line is positioned on the BBC1, as shown in FIG. 8B (in this case, the RIGHT key is pressed once). The user then presses the ENTER key in the remote control transmitter 10*b*, to determine the name of the broadcasting station to be tuned in to. Therefore, the CPU 13 knows that the BBC1 is selected, and feeds channel selection information to the digital tuner 2 such that the frequency of the physical channel corresponding to the BBC1 is tuned in to from the existent station channel information stored in the memory 14, to perform a channel selection operation.

d) It is Assumed that Three Characters are entered

The user presses the BROADCASTERMODE key in the remote control transmitter 10*b*. The processing enters a key entry wait state for a maximum of four seconds. During this time, the user presses the ten-key "2" in the remote control transmitter 10*b* which is a key corresponding to "B", similarly presses the ten-key "2" in the remote control transmitter 10*b* which is a key corresponding to "B" for four seconds in the subsequent key entry wait state, and similarly presses a ten-key "2" in the remote control transmitter 10*b* which is a key corresponding to "C" for four seconds in the subsequent key entry wait state. The CPU 13 retrieves the broadcasting station names, each starting with a letter "A", "B", "C", or "2", having a letter "A", "B", "C", or "2" as its second character, and having a letter "A", "B", "C", or "2" as its third character. The number of broadcasting station names to be candidates is not one. Accordingly, all the candidate broadcasting station names are read out of the memory 14, and are displayed, as shown in FIG. 8A. The user uses each of the UP, DOWN, RIGHT, and LEFT keys in the remote control transmitter 10*b* so that an enclosed line is positioned on the BBC1, as shown in FIG. 8B (in this case, the RIGHT key is pressed once). The user then presses the ENTER key in the remote control transmitter 10*b*, to determine the name of the broadcasting station to be tuned in to. Therefore, the CPU 13 knows that the BBC1 is selected, and feeds channel selection information to the digital tuner 2 such that the frequency of the physical channel corresponding to the BBC1 is tuned in to from the existent station channel information stored in the memory 14, to perform a channel selection operation.

e) It is Assumed that Four Characters are entered

The user presses the BROADCASTERMODE key in the remote control transmitter 10*b*. The processing enters a key entry wait state for a maximum of four seconds.

Figure 9A:
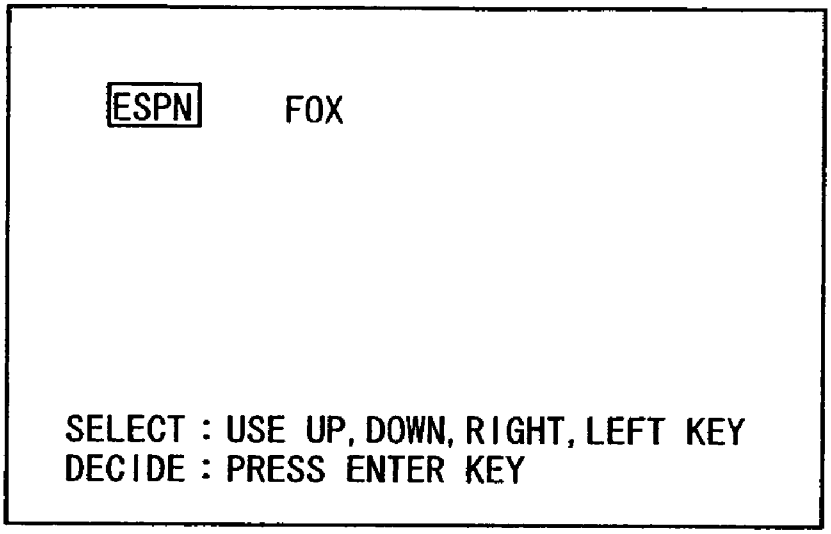
FIGS. 9A and 9B are explanatory views each showing an example of display on a screen at the time of broadcasting station name direct channel selection processing.
Figure 9B:
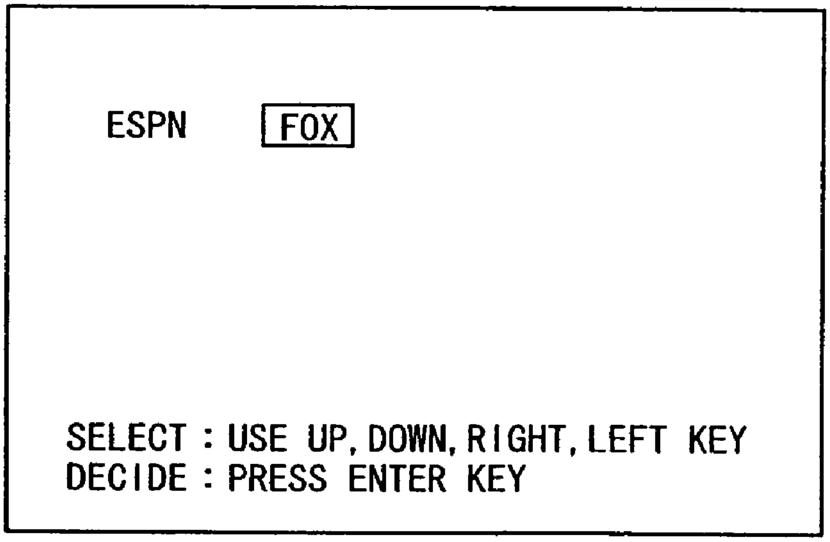

During this time, the user presses the ten-key “2” in the remote control transmitter 10*b* which is a key corresponding to “B”, similarly presses the ten-key “2” in the remote control transmitter 10*b* which is a key corresponding to “B” for four seconds in the subsequent key entry wait state, similarly presses the ten-key “2” in the remote control transmitter 10*b* which is a key corresponding to “C” for four seconds in the subsequent key entry wait state, and similarly presses a ten-key “1” in the remote control transmitter 10*b* which is a key corresponding to “1” for four seconds in the subsequent key entry wait state. The CPU 13 retrieves the broadcasting station names, each starting with a letter “A”, “B”, “C”, or “2” having a letter “A”, “B”, “C” or “2” as its second character, having a letter “A”, “B”, “C”, or “2” as its third character, and having a letter “1”, as its fourth character. In this case, the number of broadcasting station names to be candidates is one, i.e., “BBC1”. Therefore, the CPU 13 knows that the BBC1 is selected, and feeds channel selection information to the digital tuner 2 such that the frequency of the physical channel corresponding to the BBC1 is tuned in to from the existent station channel information stored in the memory 14, to perform a channel selection operation.

ii) When an attempt to tune in to FOX is made a) It is assumed that only one character is entered The user presses the BROADCASTERMODE key in the remote control transmitter lob. The processing enters a key entry wait state for a maximum of four seconds. During this time, the user presses a ten-key “3” in the remote control transmitter 10*b* which is a key corresponding to “F”. There is no key entry in the subsequent key entry wait state. Accordingly, the CPU 13 retrieves the broadcasting station names, each starting with a letter “D”, “E”, “F”, or “3”. In this case, the number of broadcasting station names to be candidates is not one. Accordingly, all the candidate broadcasting station names are read out of the memory 14, and are displayed, as shown in FIG. 9A. The user uses each of the UP, DOWN, RIGHT, and LEFT keys in the remote control transmitter 10*b* so that an enclosed line is positioned on the FOX, as shown in FIG. 9B (in this case, the RIGHT key is pressed once). The user then presses the ENTER key in the remote control transmitter 10*b*, to determine the name of the broadcasting station to be tuned in to. Therefore, the CPU 13 knows that the FOX is selected, and feeds channel selection information to the digital tuner 2 such that the frequency of a physical channel corresponding to the FOX is tuned in to from the existent station channel information stored in the memory 14, to perform a channel selection operation.

b) It is assumed that two characters are entered

The user presses the BROADCASTERMODE key in the remote control transmitter 10*b*. The processing enters a key entry wait state for a maximum of four seconds. During this time, the user presses the ten-key “3” in the remote control transmitter 10*b* which is a key corresponding to “F”, and similarly presses a ten-key “6” in the remote control transmitter 10*b* which is a key corresponding to “0” for four seconds in the subsequent key entry wait state. There is no key entry in the subsequent key entry wait state. Accordingly, the CPU 13 reads out of the memory 14 the broadcasting station names, each starting with a letter “D”, “E”, “F”, or “3” and having a letter “M”, “N”, “O”, or “6” as its second character. In this case, the number of broadcasting station names to be candidates is one, i.e., “FOX”. Therefore, the CPU 13 knows that the FOX is selected, and feeds channel selection information to the digital tuner 2 such that the frequency of the physical channel corresponding to the FOX is tuned in to from the existent station channel information stored in the memory 14, to perform a channel selection operation.

iii) When an attempt to tune in to TNT is made

The user presses the BROADCASTERMODE key in the remote control transmitter lob. The processing enters a key entry wait state for a maximum of four seconds. During this time, the user presses a ten-key “8” in the remote control transmitter 10*b* which is a key corresponding to “T”. There is no key entry in the subsequent key entry wait state. Accordingly, the CPU 13 reads out of the memory 14 the broadcasting station names, each starting with a letter “T”, “U”, “V”, or “8”. In this case, the number of broadcasting station names to be candidates is one, i.e., “TNT”. Therefore, the CPU 13 knows that the TNT is selected, and feeds channel selection information to the digital tuner 2 such that the frequency of a physical channel corresponding to the TNT is tuned in to from the existent station channel information stored in the memory 14, to perform a channel selection operation.

In the above-mentioned example, the broadcasting station names including the characters entered by an operation of the remote control transmitter 10*b* are selected in each step of the key entry, a list of the broadcasting station names is displayed on the screen, and a channel selection operation for receiving a broadcasting wave from the broadcasting station determined on the basis of the operation on the display screen is performed. That is, the digital broadcasting receiver is so constructed that the broadcasting station can be tuned in to by a smaller number of characters than the number of characters required to specify the broadcasting station name. If the user knows even one character at the head of the name of the broadcasting station which he or she desires to view, therefore, a list of the broadcasting station names including the character at the head is displayed, and the name of the broadcasting station which is desired to be viewed is determined on the list of the screen, so that an operation for tuning in to the broadcasting station is automatically performed. Further, if the user knows two characters at the head of the broadcasting station name, a list further narrowed down from the above-mentioned list is displayed, so that the broadcasting station name can be selected on the list of the screen.

On the other hand, the user may know a complete character string of the name of the broadcasting station on which a program which he or she will view is broadcast in many cases. Consequently, the digital broadcasting receiver may be so constructed that the above-mentioned remote control transmitter 10*b* is used, to judge the name of the broadcasting station through the execution of the key entry the number of times of which corresponds to the character string, for example, 2221 in case of BBC1 , 3776 in case of ESPN, and 266 in case of CNN. Even in such a configuration, the user can cause the receiver to recognize the name of the broadcasting station which he or she desires to view by the key entry to perform an operation for tuning in to the broadcasting station. Accordingly, a channel can be selected without depending on direct channel selection in which it is difficult to understand which of a virtual number and a physical number is used to select a channel or channel selection using EPG whose operation takes time and labor. Accordingly, it is possible to easily and quickly perform an operation for tuning in to the desired broadcasting station.

Although in the above-mentioned remote control transmitter 10*b*, alphabetic characters, for example, "ABC" correspond to a ten-key, Japanese characters and characters used in the other foreign countries may correspond thereto. Further, when a broadcaster ID assigned to "SANKAKU broadcasting station" is "SBC", the digital broadcasting receiver can be also constructed that a table for establishing a correspondence between "SANKAKU broadcasting station" and "SBC" is provided, and the name of the broadcasting station which is desired by the user is recognized as "SBC" to perform an operation for tuning in to the broadcasting station when "SANKA . . . " is entered using the ten-key. Although in the above-mentioned remote control transmitter 10*b*, three characters or four characters are caused to correspond to one key, one character can be caused to correspond to one key when a remote control transmitter in a keyboard shape is used.

As described in the foregoing, according to the above-mentioned processing, the effect of easily and quickly tuning in to a desired broadcasting station without depending on direct channel selection in which it is difficult to understand which of a virtual number and a physical number is used to select a channel or channel selection using EPG whose operation takes time and labor is produced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a digital broadcasting receiver that receives digital broadcasting, the digital broadcasting receiver comprising:

storage means for storing the names of broadcasting stations and information for tuning in to the broadcasting stations with a correspondence established therebetween;

means for handling an output signal of a key in a remote control transmitter using the key as a key representing one or a plurality of characters to select the name of the broadcasting station corresponding to the entered character or characters; and means for performing a channel selection operation for receiving a broadcasting wave from the selected broadcasting station, wherein the receiver is so constructed as to display, when there is no key entry within a predetermined time period elapsed since a mode for tuning in to broadcasting stations by the names thereof was selected, the stored names of all the broadcasting stations on the screen, thereby making it possible to determine the name of the broadcasting station on the basis of an operation on the display screen.

2. The digital broadcasting receiver according to claim 1, wherein the receiver is so constructed as to take out information related to the name of the broadcasting station and information for tuning in to the broadcasting station from the digital broadcasting wave, and store the name of the broadcasting station and the information for tuning in to the broadcasting station with a correspondence established therebetween.

3. In a digital broadcasting receiver that receives digital broadcasting, the digital broadcasting receiver comprising:

storage means for storing the names of broadcasting stations and information for tuning in to the broadcasting stations with a correspondence established therebetween;

means for handling an output signal of a key in a remote control transmitter using the key as a key representing one or a plurality of characters to select the name of the broadcasting station including the character or characters entered by the key in each step of key entry and display a list of the names of the broadcasting stations on a screen; and means for performing a channel selection operation for receiving a broadcasting wave from the broadcasting station determined on the basis of an operation on the display screen, wherein the receiver is so constructed as to display, when there is no key entry within a predetermined time period elapsed since a mode for tuning in to broadcasting stations by the names thereof was selected, the stored names of all the broadcasting stations on the screen, thereby making it possible to determine the name of the broadcasting station on the basis of an operation on the display screen.

4. The digital broadcasting receiver according to claim 3, wherein the receiver is so constructed as to take out information related to the name of the broadcasting station and information for tuning in to the broadcasting station from the digital broadcasting wave, and store the name of the broadcasting station and the information for tuning in to the broadcasting station with a correspondence established therebetween.

* * * * *